US006724825B1

(12) United States Patent
Nemiroff et al.

(10) Patent No.: US 6,724,825 B1
(45) Date of Patent: Apr. 20, 2004

(54) REGENERATION OF PROGRAM CLOCK REFERENCE DATA FOR MPEG TRANSPORT STREAMS

(75) Inventors: Robert S. Nemiroff, Carlsbad, CA (US); Vincent Liu, San Diego, CA (US); Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 713 days.

(21) Appl. No.: 09/667,734

(22) Filed: Sep. 22, 2000

(51) Int. Cl.[7] .............................. H04B 7/66; H04N 7/12
(52) U.S. Cl. ..................... 375/240.27; 386/96; 386/111
(58) Field of Search ....................... 375/240.01, 240.02, 375/240.2, 240.03, 240.21, 240.28, 240.29; 348/404.1, 405.1, 423.1, 424.1; 386/109, 110, 111, 65, 96, 97, 98, 99, 104, 106; H04N 7/12; H04B 1/66

(56) References Cited

U.S. PATENT DOCUMENTS

| | | | |
|---|---|---|---|
| 5,623,312 A | 4/1997 | Yan et al. | |
| 5,650,860 A | 7/1997 | Uz | |
| 5,694,170 A | 12/1997 | Tiwari et al. | |
| 5,701,160 A | 12/1997 | Kimura et al. | |
| 5,719,986 A | 2/1998 | Kato et al. | |
| 5,805,220 A | 9/1998 | Keesman et al. | |
| 5,905,732 A | 5/1999 | Fimoff et al. | |
| 5,917,830 A * | 6/1999 | Chen et al. ................. | 370/487 |
| 5,920,572 A | 7/1999 | Washington et al. | |
| 5,949,490 A | 9/1999 | Borgwardt et al. | |
| 6,002,687 A | 12/1999 | Magee et al. | |
| 6,111,896 A | 8/2000 | Slattery et al. | |
| 6,347,119 B2 * | 2/2002 | Matsumura et al. ... | 375/240.28 |
| 6,356,567 B2 * | 3/2002 | Anderson et al. ........... | 370/516 |
| 2001/0004366 A1 * | 6/2001 | Matsumura et al. ........ | 370/509 |
| 2001/0033619 A1 * | 10/2001 | Hanamura et al. ..... | 375/240.26 |
| 2002/0196850 A1 * | 12/2002 | Liu et al. ............... | 375/240.12 |

FOREIGN PATENT DOCUMENTS

| | | |
|---|---|---|
| EP | 0 550 843 | 7/1993 |
| EP | 0 851 656 | 7/1998 |
| WO | WO 00/21302 | 4/2000 |
| WO | WO 0225952 A2 * | 3/2002 ............ H04N/7/24 |

OTHER PUBLICATIONS

G. Keesman, et al., "Bit–rate control for MPEG encoders," Signal Processing: Image Communication, vol. 6, pp. 545–560, 1995.

(List continued on next page.)

Primary Examiner—Tung T. Vo
(74) Attorney, Agent, or Firm—Barry R. Lipsitz; Douglas M. McAllister

(57) ABSTRACT

A system for providing an accurate time reference for multiple input and output digital video signals of a transcoder that is particularly suited for use with MPEG data. The multiple streams are synchronized with a single master system time clock at the transcoder. Timing data from the master clock is compared to timing data from packets that are input to the transcoder to determine an offset. In particular, timing data, such as a program clock reference (PCR) field, is recovered from packets of different channels that are input to the transcoder. For each channel, timing data is then provided for packets that are output from the transcoder based on the offset and timing data of the master clock at the respective output times. In particular, the adjusted timing data is determined as a sum of the offset and an associated hardware error, less a delay (PcrSysDly) associated with the transcoder, which includes a lookahead delay and a buffer delay. The associated hardware error represents an error of the master clock and/or a system time clock of an encoder that encoded the particular channel.

33 Claims, 3 Drawing Sheets

OTHER PUBLICATIONS

D. Bagni, et al., "Efficient Intra–frame Encoding and improved Rate Control in H.263 compatible format," NTG Fachberichte, pp. 767–774 XP002095679 ISSN: 0341–0196, Sep. 10, 1997.

Björk, Niklas et al., "Transcoder Architectures for Video Coding," IEEE Transactions on Consumer Electronics, vol. 44, No. 1, Feb. 1998, pp. 88–98.

Staff of Cable Television Laboratories Inc., "Digital TV Solutions," From the Labs: Cable World, Feb. 1, 1999.

* cited by examiner

REGENERATION OF PROGRAM CLOCK REFERENCE DATA FOR MPEG TRANSPORT STREAMS

BACKGROUND OF THE INVENTION

The present invention relates to transcoding of digital video signals, and in particular, to providing an accurate time reference for the input and output signals of a transcoder.

Commonly, it is necessary to adjust a bit rate of digital video programs that are provided, e.g., to subscriber terminals in a cable television network or the like. For example, a first group of signals may be received at a headend via a satellite transmission. The headend operator may desire to forward selected programs to the subscribers while adding programs (e.g., commercials or other content) from a local source, such as storage media or a local live feed. Additionally, it is often necessary to provide the programs within an overall available channel bandwidth.

Accordingly, the statistical remultiplexer (stat remux), or transcoder, which handles pre-compressed video bit streams by re-compressing them at a specified bit rate, has been developed. Similarly, the stat mux handles uncompressed video data by compressing it at a desired bit rate.

In such systems, a number of channels of data are processed by a number of processors arranged in parallel. Each processor typically can accommodate multiple channels of data. Although, in some cases, such as for HDTV, which require many computations, portions of data from a single channel are allocated among multiple processors.

Single-channel transcoders are also used in various applications.

In a digital video compression system, such as the MPEG-2 system, the digital video source is clocked at 27 MHz (D1 video standard). The decoder must generate the same 27 MHz clock such that the encoder and decoder clocks are locked. This clock is referred to as the System Time Clock (STC). Both the encoder and decoder have a counter that is incremented on each tick of the STC. When the encoder and decoder STCs are synchronized, both counters are the same value.

To synchronize the decoder, the encoder sends a PCR (Program Clock Reference) to the decoder. The PCR is the value of the STC counter at the instant the packet with the PCR leaves the encoder. When the packet with the PCR is received by the decoder, the decoder compares this value with its STC counter value. If the two are the same, no adjustment is needed. If the two values are different, the decoder must either reset, speed up, or slow down its STC.

In various transcoding applications, the processing acts like multiple pairs of decoders encoders are used since each input video channel is transcoded (e.g., decoded and re-encoded). Thus, the input STC must be recovered for each channel, and a new PCR must then be output for the re-encoded output. One possible solution is to have one local STC for each video service that is received. However, this is expensive since it requires a phase-locked loop (PLL) for every video service.

Accordingly, it would be desirable to provide a cost-effective and efficient system for recovering an input STC from each channel in a transcoder, and outputting a new PCR for the re-encoded output.

The system should use only one master STC, and correct for the differences between the master STC and the STCs of the different services or channels.

The system should be implementable in software.

The system should avoid the need for multiple counters.

The system should correct for a frequency difference between the master STC and input STC.

The system should also account for changes in Decoding Time Stamps (DTSs) and Presentation Time Stamps (PTSs).

A lookahead delay at a transcoder, and buffer delays of an encoder of the transcoder and of an end user decoder, should also be accounted for.

The present invention provides a system having the above and other advantages.

SUMMARY OF THE INVENTION

The present invention relates to providing an accurate time reference for the input and output digital video signals of a transcoder.

Instead of using one local STC clock for each video service that is received, the invention uses only one master STC. The differences between the master STC and the service's input STC are then corrected, e.g., using software.

Advantageously, an offset between the master STC and input PCRs is computed to avoid multiple counters. A frequency difference between the master STC and input STC is then computed. This frequency difference is corrected when computing the output PCR.

In addition, the invention also corrects the PTSs and DTSs, which inform a decoder when to present (display) and decode a picture, respectively, whether the decoder is part of a transcoder, or a stand alone end user's decoder, such as in a set-top box. In particular, the DTS references the PCR. For example, when the PCR equals the DTS for a picture, that picture is decoded. The computed STC is referenced at the input to the transcoder. A video frame is delayed by a fixed amount due the transcoding delay. This delay is the time of the original PTS/DTS of the input stream until the time of the transcoded PTS/DTS. Therefore, the original PTS and DTS must be adjusted by adding in this delay. However, instead of modifying both the PCR and the time stamps (PTS and DTS), we subtract this delay from the PCR to create the same effect.

A method in accordance with the invention for providing adjusted timing data for a plurality of respective channels that are input to a transcoder, includes the step of, for each channel, recovering timing data (PcrIn) from at least one packet thereof that is input to the transcoder at a respective input time, and determining an associated offset (PcrOffset) between the recovered timing data (PcrIn) and timing data (PcrInHwTag) of a master system time clock of the transcoder at the respective input time. Additionally, for each channel, adjusted timing data (PcrOut) is provided in at least one packet thereof that is output from the transcoder at a respective output time according to the associated offset (PcrOffset), and timing data (PcrOutHwTag) of the master system time clock at the respective output time.

Moreover, the adjusted timing data (PcrOut) is further provided in the at least one packet that is output from the transcoder according to a sum of the associated offset and an associated hardware error (PcrHwErr), less a delay (PcrSysDly) associated with the transcoder.

The associated hardware error (PcrHwErr) is associated with: (a) the master system time clock and (b) a system time clock of an encoder that encoded the particular channel, and the delay (PcrSysDly) associated with the transcoder includes a lookahead delay (lookahead_dly) and a buffer delay (buffer_dly).

A corresponding apparatus is also presented.

DETAILED DESCRIPTION OF THE INVENTION

The present invention relates to providing an accurate time reference for the input and output digital video signals of a transcoder.

The following acronyms and terms are used:

DPRAM—Dynamic Programmable Random Access Memory
DTS—Decoding Time Stamp
FIFO—First-In, First-Out
FPGA—Field-Programmable Gate Array
MTS—MPEG Transport Stream
PAT—Program Association Table
PCI—Peripheral Component Interconnect
PCR—Program Clock Reference
PID—Program Identifier
PMT—Program Management Table
PTS—Presentation Time Stamp
QL—Quantization Level
STC—System Time Clock
TCI—Transport Channel Input
TCO—Transport Channel Output
TMC—Transcoder Multiplexer Core
TSP—Television Service Provider

1. Time Stamps and PCR Calculations

Figure 1:
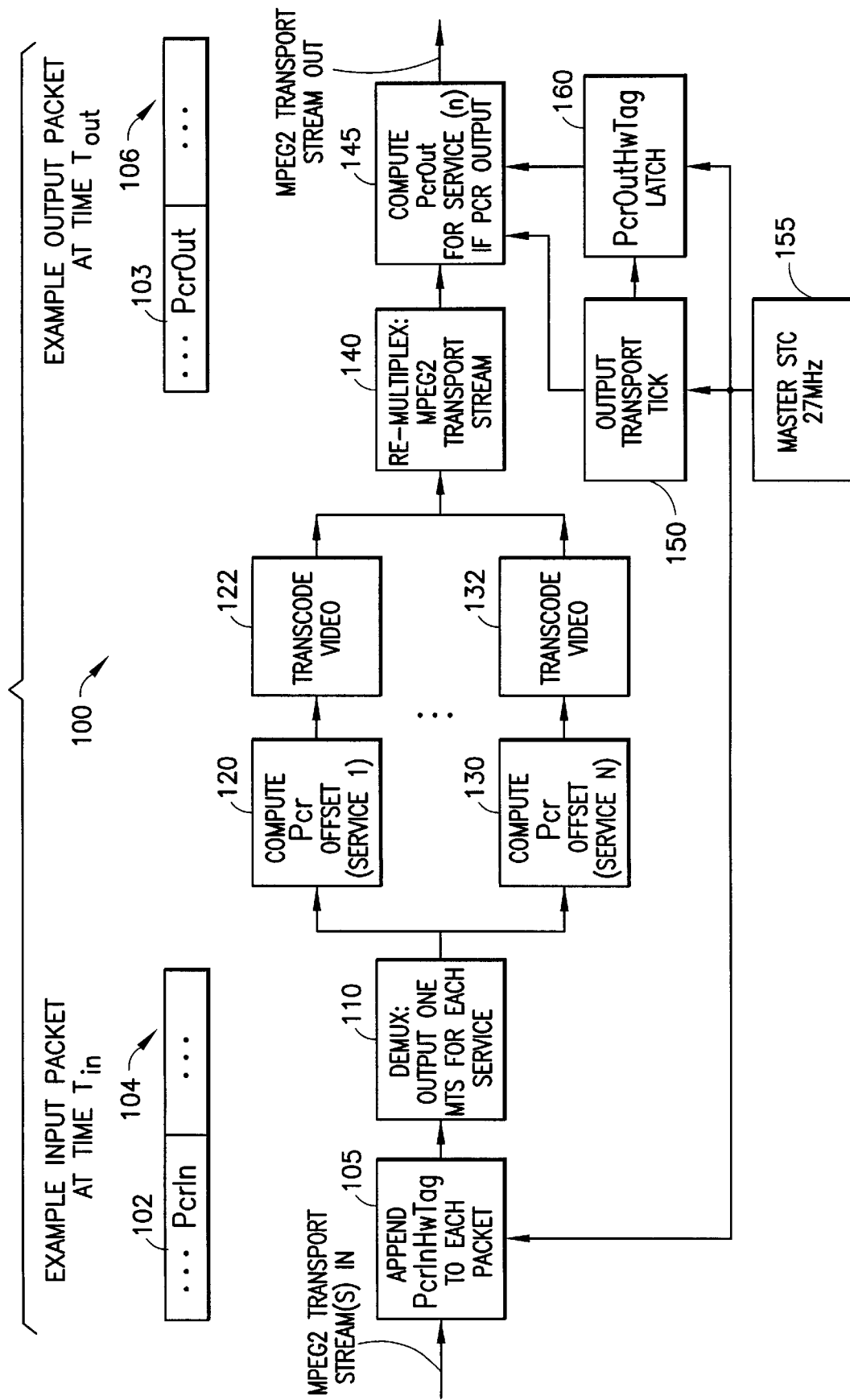
FIG. 1 illustrates a block diagram of a transcoder in accordance with the present invention.

FIG. 1 illustrates a block diagram of a transcoder in accordance with the present invention.

In accordance with the invention, the transcoder 100 uses one master system clock 155, and makes computations for PCR corrections as described below. This avoids the need for a PLL for each transport stream.

The transcoder 100 receives one or more transport stream (s) and appends a tag, "PcrInHwTag"—or PCR input hardware tag, to each packet at an append function 105. This tag represents the clock data of the master STC 155 at the time the packet is input to the transcoder. At a demux 110, one MPEG transport stream is output for each service. A first service is processed at functions 120 and 122, and a final, Nth, service is processed at functions 130 and 132. Each service is referred to generally as an nth service, where n=1, . . . , N.

In particular, at the function 120, an offset between the PCR of the first service and a PCR of the master clock 155 is determined. Similarly, at the function 130, an offset between the PCR of the Nth service and a PCR of the master clock 155 is determined. The above processing is applied when the PCR is present. Generally, the PCR is not provided in every packet, but may be provided, e.g., every 100 ms, every frame or at other regular or irregular intervals. With MPEG, the time between PCRs may be no more than 100 ms.

The data from the services is transcoded at respective transcode functions 122, . . . , 132.

Each nth service is handled analogously.

The transcoded video is remultiplexed at a remux 140, and an output PCR value, PcrOut, is computed at a function 145, for those packets where the PCR is present.

The function 145 is responsive to an output transport tick 150, and a PCR output hardware tag, PcrOutHwTag, 160, which are both, in turn, responsive to the master clock 155. This tag represents the clock data of the master STC 155 at the time a packet is output from the transcoder.

When an input packet 104 arrives, the function 105 appends a transport time stamp, PcrInHwTag, to the packet. The PcrInHwTag is latched from the Master System Time Clock, MasterSTC 155. The transcoder 100 reduces the rate of the video at the transcoder functions 122, . . . , 132, and repacketizes the transport stream at the remux 140.

At the Tq period (a quantization time period), each transcoder 122, . . . , 132 sends the number of packets that it was allocated to the function 145, e.g., via a PCI bus. Some of these packets will contain a placeholder for a PCR. Placeholders are inserted by the transcoders 122, . . . , 132 at the PCR rate for the associated channel(s).

The function 145 provides output packets, such as an example output packet 106 that includes a header 103 with an adjusted PCR field in accordance with the invention.

The function 145 receives a transport tick produced by the transport tick function 150. The function 145 computes the PCR and inserts it in the PCR slot, if a PCR placeholder is present in the current packet. The transport packet 106 is sent but the function 145 via an appropriate output. That transport packet may be buffered and read out a fixed number of transport ticks later.

1.1. Input Clock Recovery

One master 27 MHz system time clock, MasterSTC, 155 is used for all channels. When a packet 104 with a PCR arrives, the MasterSTC 155 cannot be set to this PCR value because of the multiple channels. Instead, for each channel, the current value of the MasterSTC is latched at the latch 160, and the difference, PcrOffset, is computed as:

$$PcrOffset = PcrIn - PcrInHwTag,$$

where PcrIn is the PCR value in the transport header, e.g., as shown in the header 102 of the example packet 104. Other header information is not shown.

PcrInHwTag is the PCR hardware tag; this is the count of the free running MasterSTC 155 at the time the packet 104 with the PcrIn arrived.

If it is assumed that all the channels clocks and the STC 155 are exactly 27 MHz, the instantaneous System Time Clock for each channel is:

$$STC = MasterSTC + PcrOffset$$

The STC at the output transport tick time is:

$$STC = PcrOutHwTag + PcrOffset$$

Where PcrOutHwTag is the MasterSTC at the output transport tick time.

However, the above scenario does not account for hardware errors of the channels clocks and the master clock which are experienced in practice. See the section on "PCR Jitter" below. In particular, the 27 MHz clocks may be off by, e.g., 30 ppm. In accordance with the invention, an adjust ment is made to the STC for a PCR hardware error (PcrHwErr), as follows:

$$STC = PcrOutHwTag + PcrOffset + PcrHwErr \quad (1)$$

Figure 2:
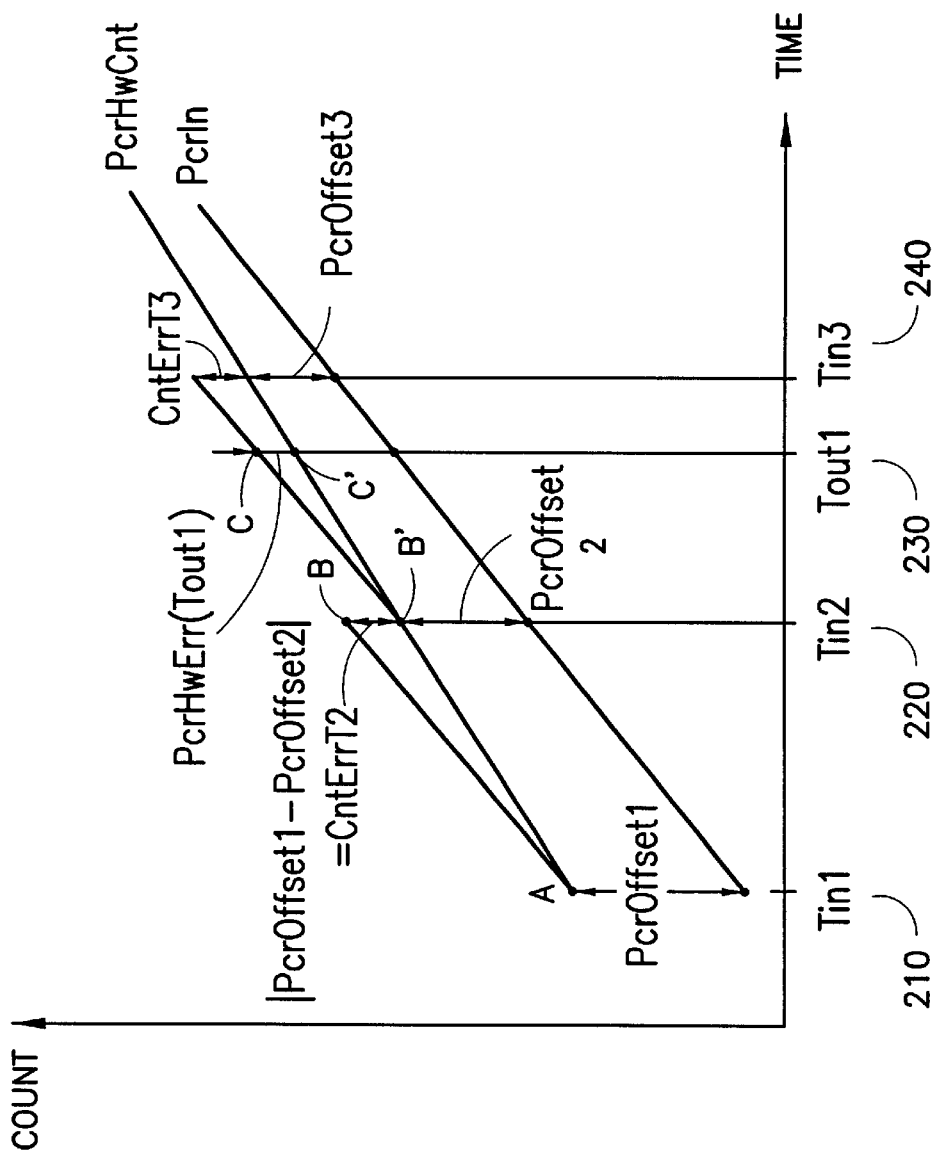
FIG. 2 illustrates the adjustment of a Program Clock Reference (PCR) in accordance with the present invention.

PcrHwErr is the estimated error of PcrOutHwTag due to the small difference between the 27 MHz hardware counter on the transcoder and the video source 27 MHz PCR counter. Refer to FIG. 2, which illustrates the adjustment of a Program Clock Reference (PCR) in accordance with the present invention.

Note that the master STC is derived from a clock, such as a 27 MHz clock. It is possible for software to generate a 27 MHz clock, but this clock is derived from the processor clock, which in turn, is generated by hardware, such as a crystal oscillator. The term hardware error or the like is therefore meant to encompass such cases. The following expression indicates the PcrHwErr at a time Tout, which is the output time of a packet from the transcoder 100. Tin is the input time of a packet with a PCR to the transcoder 100.

$$PcrHwErr_{Tout} = \alpha_{Tout} * (Tout - Tin(n))$$

Where Tin(n) is the most recent PcrIn time. "n" is an index of successive recovered PCR values from an associated channel. Also:

$$\alpha_{Tout} = CntErr_{Tin(n)}/(Tin(n) - Tin(n-1))$$

$$CntErr_{Tin(n)} = Pcroffset_{Tin(n)} - Pcroffset_{Tin(n-1)}.$$

CntErr refers to a count error.

Note that the transcoder 100 depacketizes each input stream at the demux 110. Except for the passthrough packets, described in section 1.4, the input packets no longer exist, although some packet header information and the entire payload is saved. New packets are generated at the output of the data encoder 328.

As mentioned, if the transcoder and source 27 MHz clocks were locked, $CntErr_{Tin(n)}$ is zero.

Substituting for $CntErr_{Tin(n)}$:

$$\alpha_{Tout} = \frac{PcrOffset_{Tin(n)} - PcrOffset_{Tin(n-1)}}{Tin(n) - Tin(n-1)}$$

Substituting for $\alpha_{Tout}$:

$$PcrHwErr_{Tout} = (Tout - Tin(n)) \cdot \frac{PcrOffset_{Tin(n)} - PcrOffset_{Tin(n-1)}}{Tin(n) - Tin(n-1)}$$

The PcrInHwTag and PcrOutHwTag values may be used to track time, T, in which case PcrHwErr(Tout) can alternatively be expressed as:

$$PcrHwErr_{Tout} = (PcrOutHwTag_{Tout} - PcrInHwTag_{Tin(n)}) \cdot$$

$$\frac{PcrOffset_{Tin(n)} - PcrOffset_{Tin(n-1)}}{PcrInHwTag_{Tin(n)} - PcrInHwTag_{Tin(n-1)}}$$

An example is shown in FIG. 2. A PcrOffset1 is shown at a time Tin1 (210), a PcrOffset2 and CntErrT2 are shown at a time Tin2 (220), a time Tout1 (230) is shown, and a PcrOffset3 and CntErrT3 are shown at a time Tin3 (240). Tin1, Tin2, . . . refer to the input times of first, second . . . packets. Tout1 is the output time of the first packet.

PcrHwCnt is the counter of the master clock, and PcrIn is the input PCR value recovered from the input packet.

Note that the PcrHwErr increases in magnitude with time, and is reset to zero at each input time. Essentially, if a PCR packet is output at the same time an input PCR packet arrives, PcrHwErr would be zero, since there is no hardware drift after the initial calculation of PcrOffset. However, if there is a delay between an input PCR packet and an output PCR packet, PcrHwErr increases at a rate given by the slope α, described below.

$$PcrHwErr(Tout1) = \alpha*(Tout1 - Tin2),$$

where $\alpha = (PcrOffset_{Tin2} - PcrOffset_{Tin1})/(Tin2 - Tin1).$

The slope α is essentially the slope of the line A–B relative to the line A–B'. The line B'–C is assumed to have the same slope relative to the line B'–C', which is a good assumption since the relative slope will change very little between input time intervals.

Thus, at Tout1, the change in the PcrOffset values of the two most recent packets are used to obtain a relative slope α. PcrHwErr at the time of the current output packet, e.g., PcrHwErr(Tout1), is then determined based on the relative slope α, and the time interval between the time of the current output packet (Tout1) and the time of the most recent input packet (Tin2) (or other previous input packet other than the most recent). This can be expressed as follows:

$$PcrHwErr_{Tout1} = (Tout1 - Tin2) \cdot \frac{PcrOffset_{Tin2} - PcrOffset_{Tin1}}{Tin2 - Tin1}$$

This equation can be expressed alternatively by using PcrInHwTag and PcrOutHwTag in place of Tout and Tin, respectively, as follows:

$$PcrHwErr_{Tout1} = (PcrOutHwTag_{Tout1} - PcrInHwTag_{Tin2}) \cdot$$

$$\frac{PcrOffset_{Tin2} - PcrOffset_{Tin1}}{PcrInHwTag_{Tin2} - PcrInHwTag_{Tin1}}$$

where $$\alpha = \frac{PcrOffset_{Tin2} - PcrOffset_{Tin1}}{PcrInHwTag_{Tin2} - PcrInHwTag_{Tin1}}$$

Care must be taken to account for counter wraparound that can occur with the master STC 155. That is, the count of the master STC is represented by fixed number of bits, so the maximum value is limited. When the counter reaches this maximum values, it starts counting again at zero.

As an option, α may be averaged over the last N PcrIn times. Also, in this case, a weighted average may be used, e.g., using a recursive filter.

1.1.1 Implementation Adjustments

The technique shown assumes that packets are analyzed as they are input to the transcoder. In practice, the packets are stored in a MTS Buffer and analyzed periodically between transcoding frames. Therefore the most recent PCR may not be available at the time the output PCR must be corrected. Therefore, the most recent PcrOffset and a processed during transport demux are used for PCR correction.

1.2. PCR, DTS, PTS

Instead of altering all three fields, PCR, DTS and PTS, the PCR alone may be adjusted to account for the DTS and PTS changes.

Figure 3:
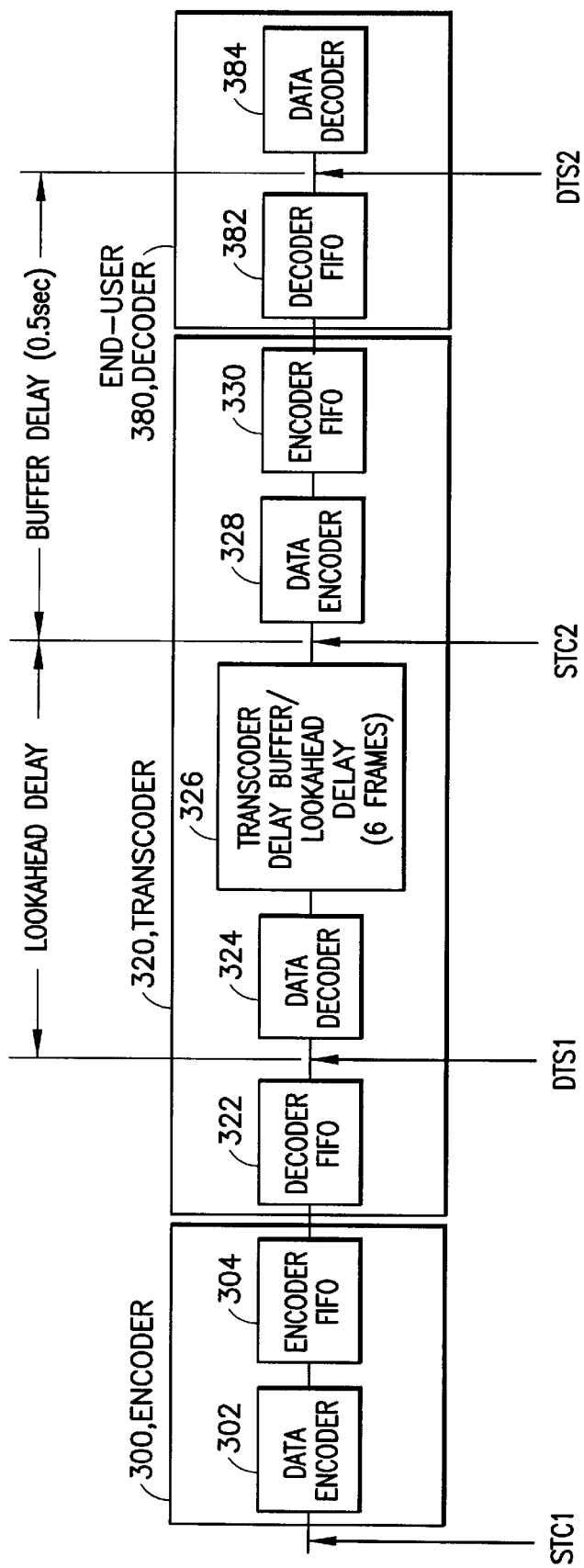
FIG. 3 illustrates a transcoder that performs PCR correction in accordance with the present invention.

The transcoder is modeled as a decoder and encoder. See FIG. 3, which represents a single point in time. FIG. 3 illustrates transcoder that performs PCR correction in accordance with the present invention. Again, since the decoders depacketize the packets into payloads, an output packet cannot be strictly associated with an input packet. A packet is only kept intact for a passthrough channel, where PCR correction is performed differently (see section 1.4).

An encoder 300 encodes uncompressed source video data, e.g., at a studio, live feed, satellite distribution point, or the like, and provides a compressed data stream to a transcoder 320. The transcoder 320 performs decoding and re-encoding operations to provide a new compressed data stream, with a reduced bit rate, to an end-user decoder 380. The end-user decoder 380 may be a representative set-top box in a broadband communication network, such as a cable or satellite television network, for example. The decoder 380 decodes and decompressed the received data to provide it in a format that is suitable for display.

The encoder 300 includes a data encoding function 302 and an FIFO buffer 304. The transcoder 320 includes a decoder FIFO 322, a data decoder 324, a transcoder delay buffer/lookahead delay 326 that stores, e.g., six frames, a data encoder 328 and an encoder FIFO 330. The decoder 380 includes a decoder FIFO 382 and a data decoder 384.

The decoder 324 and encoder 328 of the transcoder 320 are representative functions, as essentially any type of transcoding may be used. For example, some transcoders use full decoding and re-encoding, which is relatively computationally intensive. Other transcoders use partial decoding, followed by re-encoding. For example, various information such as motion vectors may be reused to avoid the need for motion estimation during encoding, which reduce the computations at the transcoder. Additionally, a passthrough mode may be used in accordance with the invention, as described in section 1.4 below. Moreover, a transcoder may operate in different modes at different times, and/or for different channels.

A lookahead delay extends from DTS1 to STC2, and a buffer delay (which includes delays through the buffers 330 and 382) extends from time STC2 to DTS2. The buffer delay may be, e.g., 0.5 sec., but can vary for different systems. An overall or packet delay therefore includes the lookahead and buffer delays (e.g., 6 frame periods+0.5 sec.).

STC1 is referenced at the original encode time. DTS1 is the decode time stamp for the decoder 324 embedded in the transcoder 320. STC2 is referenced at the transcoder-encode time. DTS2 is the decode time stamp for the destination decoder 380.

At the transcoder-encode time (STC2), the computed STC (as described previously) equals STC1. STC1 is clocking for DTS1. If we use the computed STC for the PCR, then DTS2 must be computed as:

$$DTS2=DTS1+PcrSysDly \quad (2)$$

where PcrSysDly=(lookahead_dly+buffer_dly);

note that the actual transcoder decode time shown in the figure is included in lookahead_dly. "Sys" denotes "system", and "Dly" denotes "delay".

If the original DTS and PTS are used, the STC must be altered to maintain the same relative time between the STC and the DTS. At the transcoder-encode time (STC2), we have:

$$DTS2-STC=CONSTANT \quad (3)$$

If DTS1 is used instead of DTS2 in the PES header, it is equivalent to subtracting PcrSysDly from DTS2 (from equation (2)). In order for the CONSTANT in equation (3) to remain the same, PcrSysDly, must be subtracted from the STC. Specifically, equation (3) is true at the time we start encoding a picture "A". At that time (STC), the DTS of picture (A-n) is DTS2. 'n' is some fixed number of pictures in the buffers/delay blocks. The time between encode start A and DTS2 is CONSTANT. This is true at the encode start time of any picture. The difference between encode start times at a 30 Hz frame rate is 900, 900 (in 27 Mhz units); the same is true for the time between consecutive DTS values.

$$STCnew=STC-PcrSysDly$$

At the time the PCR is latched, $$PcrOut=STCnew=STC-PcrSysDly$$

Therefore, substituting in equation (1), for each video channel, the output PCR is generated by the following formula:

$$PcrOut=PcrOutHwTag+PcrOffset+PcrHwErr-PcrSysDly.$$

1.3. PCR Jitter

MPEG-2 specifications for the PCR are:

27 MHz clock must be 27 MHz +/−810 Hz (30 ppm);

27 MHz Frequency Slew Rate $<75 \times 10^{-3}$ Hz/sec; and

PCR tolerance (not including network jitter) +/−500 ns.

The transcoder PCR correction has the following jitter error:

PcrInHWTag, the value of the 27 MHz hardware counter at the instant the incoming PCR packet is received may be off by one 27 MHz cycle.

PcrHwErr is exact except for rounding since the frequency slew between PCRs is 100 ms * $75 \times 10^{-3}$ Hz/sec=$75 \times 10^{-4}$ cycles. PcrHwErr is rounded to the nearest 27 MHz tick, giving ½ a 27 MHz cycle error.

The maximum PCR jitter caused by the transcoder is 1.5 27 MHz cycles or 56 ns ($1.5/(27 \times 10^6)$ sec.).

1.4. Passthrough PCR Correction

A passthrough mode may also be used in accordance with the invention, wherein the transport packets of a channel remain intact between the input and output of the transcoder, and are not transcoded. However, the passthrough packets are delayed to match the delay of the other services/channels to maintain synchronicity with these other channels that are transcoded by the transcoder.

Moreover, packet jitter may occur when packets from separate transport streams overlap in time.

The PCR is corrected by taking the difference between the PcrHwInTag for this packet and the PcrHwOutTag at the time this packet is sent out. This difference is compared with a fixed constant, TcdrPassDly (transcoder passthrough delay), and any discrepancy between the two should be corrected by adjusting the output PCR stamp, PCR. The TcdrPassDly represents the nominal time delay between the input and the output of the transcoder 320. This time also generally corresponds to DTS2-DTS1. The PCR is corrected as follows:

$$PCR=PcrIn-TcdrPassDly+(PcrHwOutTag-PcrHwInTag).$$

Accordingly, it can be seen that the present invention provides an accurate time reference for multiple input and output signals of a transcoder. An efficient design is achieved by adjusting each channel to a master clock of the transcoder. In particular, adjusted timing data is provided for output packets of a channel based on information from input packets of the channel. This information includes an offset between the PCR data and the master clock at the packet input time, a hardware error of the master clock and/or the system clock of a channel encoder, and a delay associated with the transcoder, which includes a lookahead delay and a buffer delay.

Although the invention has been described in connection with various preferred embodiments, it should be appreciated that various modifications and adaptations may be made thereto without departing from the scope of the invention as set forth in the claims.

For example, while the invention was discussed primarily in terms of transcoding of video data, it is also applicable to the transcoding of other types of data, such as audio data. In particular, for current audio standards support fixed rates (not variable rates, like for video data), transcoding from a higher fixed rate to a lower fixed rate can be performed.

What is claimed is:

1. A method for providing adjusted timing data for a plurality of respective channels that are input to a transcoder, comprising the steps of:

for each channel, recovering timing data (PcrIn) from at least one packet thereof that is input to the transcoder at a respective input time, and determining an associated offset (PcrOffset) between the recovered timing data (PcrIn) and timing data (PcrInHwTag) of a master system time clock of the transcoder at the respective input time; and for each channel, providing adjusted timing data (PcrOut) in at least one packet thereof that is output from the transcoder at a respective output time according to the associated offset (PcrOffset), and timing data (PcrOutHwTag) of the master system time clock at the respective output time;

wherein for at least one particular channel, the adjusted timing data (PcrOut) is further provided in the at least one packet that is output from the transcoder according to a hardware error (PcrHwErr) associated with: (a) the master system time clock, and (b) a system time clock of an encoder that encoded the particular channel.

2. The method of claim 1, wherein:

the recovered timing data comprises a program clock reference (PCR) field.

3. The method of claim 1, wherein:

the timing data of the master system time clock comprises a count based thereon.

4. The method of claim 1, wherein:

for at least one particular channel, the recovered timing data comprises a count based on a system time clock of an encoder that encoded the particular channel.

5. The method of claim 1, wherein:

the hardware error (PcrHwErr) is associated with a frequency drift of at least one of the master system time clock and the system time clock of the encoder.

6. The method of claim 1, wherein:

the hardware error (PcrHwErr) is determined for the at least one packet that is output from the transcoder based on a rate of change of a hardware error associated with at least two packets that were previously input to the transcoder, and a time interval between: (a) the output time of the at least one packet that is output from the transcoder, and (b) an input time of a latter one of the two previous input packets.

7. The method of claim 1, wherein:

for at least one particular channel, the adjusted timing data (PcrOut) is further provided in the at least one packet that is output from the transcoder according to a delay (PcrSysDly) associated with the transcoder that includes a lookahead delay (lookahead_dly) and a buffer delay (buffer_dly).

8. The method of claim 7, wherein:

the adjusted timing data (PcrOut) is further provided in the at least one packet that is output from the transcoder according to a sum of the associated offset and an associated hardware error (PcrHwErr), less the delay (PcrSysDly) associated with the transcoder; and the associated hardware error (PcrHwErr) is associated with: (a) the master system time clock and (b) a system time clock of an encoder that encoded the particular channel.

9. The method of claim 7, wherein:

the lookahead delay (lookahead_dly) is based on a difference between decode and encode times of the transcoder.

10. The method of claim 9, wherein:

the decode time is based on a decode time stamp.

11. The method of claim 9, wherein:

the encode time is based on the master system time clock.

12. The method of claim 7, wherein:

the buffer delay (buffer_dly) is based on a difference between an encode time of the at least one packet at the transcoder and a corresponding subsequent decode time.

13. The method of claim 12, wherein:

the encode time is based on the master system time clock.

14. The method of claim 12, wherein:

the decode time is based on a decode time stamp.

15. The method of claim 1, wherein for at least one particular channel, at least one packet thereof is passed through the transcoder without being transcoded, comprising the further step of:

delaying the output of the passed through packet from the transcoder according to a delay of the transcoder to maintain synchronicity of the particular channel with other ones of the channels that are transcoded by the transcoder.

16. The method of claim 1, wherein:

the timing data of the master system time clock is appended to the at least one packet that is input to the transcoder while the at least one packet is in a multiplex of the channels; and the channels are demultiplexed prior to the determining of the associated offset (PcrOffset).

17. An apparatus for providing adjusted timing data for a plurality of respective channels that are input to a transcoder, comprising:

means for recovering, for each channel, timing data (PcrIn) from at least one packet thereof that is input to the transcoder at a respective input time, and determining an associated offset (PcrOffset) between the recovered timing data (PcrIn) and timing data (PcrInHwTag) of a master system time clock of the transcoder at the respective input time; and means for providing, for each channel, adjusted timing data (PcrOut) in at least one packet thereof that is output from the transcoder at a respective output time according to the associated offset (PcrOffset), and timing data (PcrOutHwTag) of the master system time clock at the respective output time;

wherein for at least one particular channel, the adjusted timing data (PcrOut) is further provided in the at least one packet that is output from the transcoder according to a hardware error (PcrHwErr) associated with: (a) the master system time clock, and (b) a system time clock of an encoder that encoded the particular channel.

18. The apparatus of claim 17, wherein for at least one particular channel, at least one packet thereof is passed through the transcoder without being transcoded, comprising the further step of:

delaying the output of the passed through packet from the transcoder according to a delay of the transcoder to maintain synchronicity of the particular channel with other ones of the channels that are transcoded by the transcoder.

19. The apparatus of claim 17, wherein:

the timing data of the master system time clock is appended to the at least one packet that is input to the transcoder while the at least one packet is in a multiplex of the channels; and the channels are demultiplexed prior to the determining of the associated offset (PcrOffset).

20. The apparatus of claim 17, wherein:

the recovered timing data comprises a program clock reference (PCR) field.

21. The apparatus of claim 17, wherein:

the timing data of the master system time clock comprises a count based thereon.

22. The apparatus of claim 17, wherein:

for at least one particular channel, the recovered timing data comprises a count based on a system time clock of an encoder that encoded the particular channel.

23. The apparatus of claim 17, wherein:

the hardware error (PcrHwErr) is associated with a frequency drift of at least one of the master system time clock and the system time clock of the encoder.

24. The apparatus of claim 17, wherein:

the hardware error (PcrHwErr) is determined for the at least one packet that is output from the transcoder based on a rate of change of a hardware error associated with at least two packets that were previously input to the transcoder, and a time interval between: (a) the output time of the at least one packet that is output from the transcoder, and (b) an input time of a latter one of the two previous input packets.

25. The apparatus of claim 17, wherein:

for at least one particular channel, the adjusted timing data (PcrOut) is further provided in the at least one packet that is output from the transcoder according to a delay (PcrSysDly) associated with the transcoder that includes a lookahead delay (lookahead_dly) and a buffer delay (buffer_dly).

26. The apparatus of claim 25, wherein:

the adjusted timing data (PcrOut) is further provided in the at least one packet that is output from the transcoder according to a sum of the associated offset and an associated hardware error (PcrHwErr), less the delay (PcrSysDly) associated with the transcoder; and the associated hardware error (PcrHwErr) is associated with: (a) the master system time clock and (b) a system time clock of an encoder that encoded the particular channel.

27. The apparatus of claim 26, wherein:

the lookahead delay (lookahead_dly) is based on a difference between decode and encode times of the transcoder.

28. The apparatus of claim 27, wherein:

the decode time is based on a decode time stamp.

29. The apparatus of claim 27, wherein:

the encode time is based on the master system time clock.

30. The apparatus of claim 25, wherein:

the buffer delay (buffer_dly) is based on a difference between an encode time of the at least one packet at the transcoder and a corresponding subsequent decode time.

31. The apparatus of claim 30, wherein:

the encode time is based on the master system time clock.

32. The apparatus of claim 30, wherein:

the decode time is based on a decode time stamp.

33. A computer readable medium, having thereon computer program code means for providing adjusted timing data for a plurality of respective channels that are input to a transcoder, said computer program code means being executable to:

recover for each channel timing data (PcrIn) from at least one packet thereof that is input to the transcoder at a respective input time, and determining an associated offset (PcrOffset) between the recovered timing data (PcrIn) and timing data (PcrInHwTag) of a master system time clock of the transcoder at the respective input time;

provide for each channel adjusted timing data (PcrOut) in at least one packet thereof that is output from the transcoder at a respective output time according to the associated offset (PcrOffset), and timing data (PcrOutHwTag) of the master system time clock at the respective output time; and provide for at least one particular channel the adjusted timing data (PcrOut) in the at least one packet that is output from the transcoder according to a hardware error (PcrHwErr) associated with: (a) the master system time clock, and (b) a system time clock of an encoder that encoded the particular channel.

\* \* \* \* \*